United States Patent [19]

Hiltz

[11] Patent Number: 4,501,512
[45] Date of Patent: Feb. 26, 1985

[54] FURNITURE ARTICLE WITH COMPRESSION HUB FOR JOINING RADIAL MEMBERS

[75] Inventor: Dale V. Hiltz, Comstock Park, Mich.

[73] Assignee: Keeler Brass Company, Grand Rapids, Mich.

[21] Appl. No.: 328,450

[22] Filed: Dec. 7, 1981

[51] Int. Cl.³ .............................................. F16B 7/00
[52] U.S. Cl. .................................... 403/170; 403/217; 403/219; 403/230; 403/263; 403/373; 108/153
[58] Field of Search ............... 403/170, 171, 172, 176, 403/189, 217, 230, 218, 231, 219, 260, 263, 373; 108/153, 155, 159; 248/188.1; 211/182, 189

[56] References Cited

U.S. PATENT DOCUMENTS

| | | | |
|---|---|---|---|
| 397,225 | 2/1889 | Clow | 108/139 |
| 1,241,137 | 9/1917 | Mitchell | 403/191 |
| 2,477,997 | 8/1949 | McArthur | 287/54 |
| 2,683,329 | 7/1954 | Kobler | 46/29 |
| 2,931,467 | 4/1960 | Fentiman | 403/171 |
| 3,275,351 | 9/1966 | Fentiman | 403/171 |
| 3,309,121 | 3/1967 | Fentiman | 403/176 |
| 3,563,581 | 2/1971 | Sommerstein | 287/189.36 |
| 3,670,899 | 6/1972 | Kronenberg et al. | 211/182 |
| 3,748,802 | 7/1973 | Verderio | 256/65 |
| 3,873,219 | 3/1975 | Pofferi | 403/171 |
| 3,912,410 | 10/1975 | Pofferi | 403/170 |
| 3,985,083 | 10/1976 | Pofferi | 108/111 |
| 3,986,316 | 10/1976 | Blodee | 52/753 D |
| 4,068,957 | 1/1978 | Brems et al. | 403/296 |

Primary Examiner—Richard J. Scanlan, Jr.
Attorney, Agent, or Firm—Price, Heneveld, Huizenga & Cooper

[57] ABSTRACT

An article of furniture including an elongated member and a telescoping assembly receiving and securing an end of the elongated member. The telescoping assembly includes first and second axially aligned collars, for drawing the first and second collars toward one another to secure the elongated member end therebetween, structure for drawing the member end toward the axis of the collars, and a tubular member extending between the first and second collars and through which the elongated member extends to support the elongated member against significant twisting with respect to the telescoping assembly.

37 Claims, 7 Drawing Figures

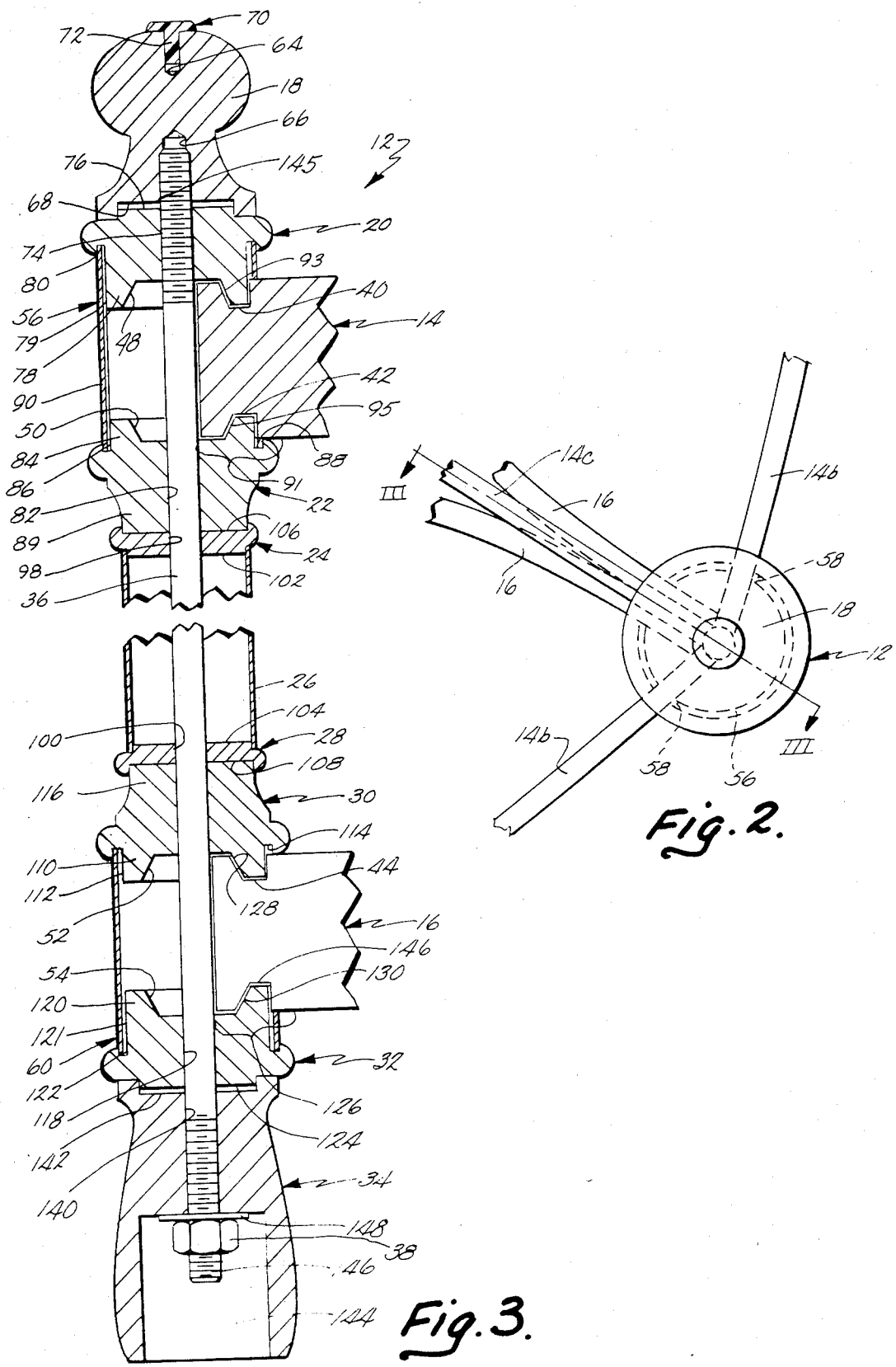

FURNITURE ARTICLE WITH COMPRESSION HUB FOR JOINING RADIAL MEMBERS

BACKGROUND OF THE INVENTION

The present invention relates to an article of furniture, and more particularly, to compression joints connecting structural members in furniture.

Many articles of furniture include a vertical support assembly in which one or more horizontal elongated members is secured. One example of such an article is a metal support structure for a table, wherein each of the vertical assemblies is a table leg and the elongated members are rails and stretchers interconnecting the table legs. The rails extend between upper portions of the table legs, while the stretchers extend between the lower portions of the table legs to provide the support structure with the desired strength.

Typically, in prior table support structures, the rails and stretchers are welded, or brazed, to the legs. However, this construction is relatively expensive due to the fact that welding and brazing are labor intensive. Further, the welding operation sometimes damages the prefinished metal parts so that the parts are spoiled. Finishing, such as polishing, must also be performed to properly finish the welds and brazes.

Although expandable joints for connecting horizontal members to vertical assemblies are available, these connections are not without their drawbacks. One such connection includes rail ends positioned between caps which are threaded onto a common rod to secure the rail end between the caps. The rail ends include angled notches and the caps include facing frusto-conical surfaces engaging the notches to further aid in securing the rail within the assembly. Further, the rail end defines a vertical groove which interfits with a rib extending from a sleeve positioned between the two caps to prevent the rail from twisting with respect to the assembly. See U.S. Pat. No. 3,986,316, entitled "JOINT ASSEMBLY" and issued Oct. 19, 1976, to Blodee. Proper tightening of such an assembly is difficult due to the facts that (1) the caps rotate against the rails restricting movement of the caps and (2) great care must be taken in gripping the caps to insure that the finish is not spoiled. Second, interfitting the vertical groove on the rail end with the relatively low rib on the sleeve is difficult further complicating assembly. Third, the completed assembly appears unfinished because various ribs are left exposed and because the diameter of the leg varies greatly from top to bottom.

Another assembly includes a slotted holding bolt with which the rail ends slidingly and tightly interfit. Grooves transverse to the rail are machined into opposite sides of the rail end which interfit with the holding bolt to prevent the rails from moving radially with respect to the bolt. Caps are provided on the bolt to engage opposite sides of the rail to further secure the rails. See U.S. Pat. No. 3,670,899, entitled "RAIL CONNECTION" and issued June 20, 1972, to Kronenberg et al. However, proper tightening of the caps is difficult because (1) care must be taken in gripping the caps to avoid marring their finish and (2) the caps rotate against the rails restricting movement of the caps. Further, the holding bolt and grooved rails are machined resulting in relatively high product cost.

Yet another joint includes a rail, a tie-rod extending through the rail end, and caps and a sleeve to hide the tie-rod and rail end. See U.S. Pat. No. 2,477,997, entitled "TUBULAR JOINT" and issued Aug. 2, 1949, to McArthur. However, the rail is connected to the tie-rod primarily due to the fact that the tie-rod extends through the horizontal member which by necessity has substantial horizontal width in order to provide the opening through which the tie-rod extends. Accordingly, the McArthur construction is not adaptable to assemblies where the rails are relatively thin and not hollow.

SUMMARY OF THE INVENTION

The aforementioned problems are solved by the present invention, by providing a vertical support member having a unique compression hub assembly for joining elongated radial members while at the same time hiding the connection so as to give the appearance that the radial members are attached to the all of the vertical support member. The assembly includes first and second collars mounted on a central tie-rod and defining first and second frusto-conical surfaces facing one another. Means are provided for drawing the collars toward one another. The end of the elongated member includes angled notches which interfit with the frusto-conical surfaces to position the elongated member immediately adjacent the tie-rod of the assembly as the first and second collars are drawn toward one another. A sleeve extends, and is secured, between the collars and defines an opening through which the elongated member extends. The opening is dimensioned to support the elongated member against significant twisting with respect to the hub.

The furniture article of the present invention provides an extremely strong and rigid connection between a vertical and horizontal member because (1) the elongated members are positioned immediately adjacent the tie-rod as the hub is tightened drawing the collars toward one another and (2) the support sleeve supports the elongated member against significant twisting with respect to the assembly axis. Further, the rail ends and their connection to the vertical support member are hidden within the support sleeve providing a neat, aesthetically pleasing appearance.

In a preferred embodiment of the invention, the means for drawing the collars toward one another includes means for allowing the collars to remain in fixed angular relationship to the elongated member. This embodiment reduces the possibility of marring the finish of the collars during assembly because the collars need not be rotated to tighten the assembly. Further, because the collars do not rotate against the elongated member (1) the collars can be drawn more securely against the elongated member and (2) the collars do not twist the rails during assembly.

These and other objects, advantages, and features of the invention will be more fully understood and appreciated by reference to the written specification and appended drawings.

BRIEF DESCRIPTION OF THE DRAWINGS

FIG. 2 is a fragmentary, top plan view taken along plane II—II in FIG. 1;

FIG. 3 is a fragmentary, sectional view taken along plane III—III in FIG. 2:

DESCRIPTION OF THE PREFERRED EMBODIMENT

Figure 1:
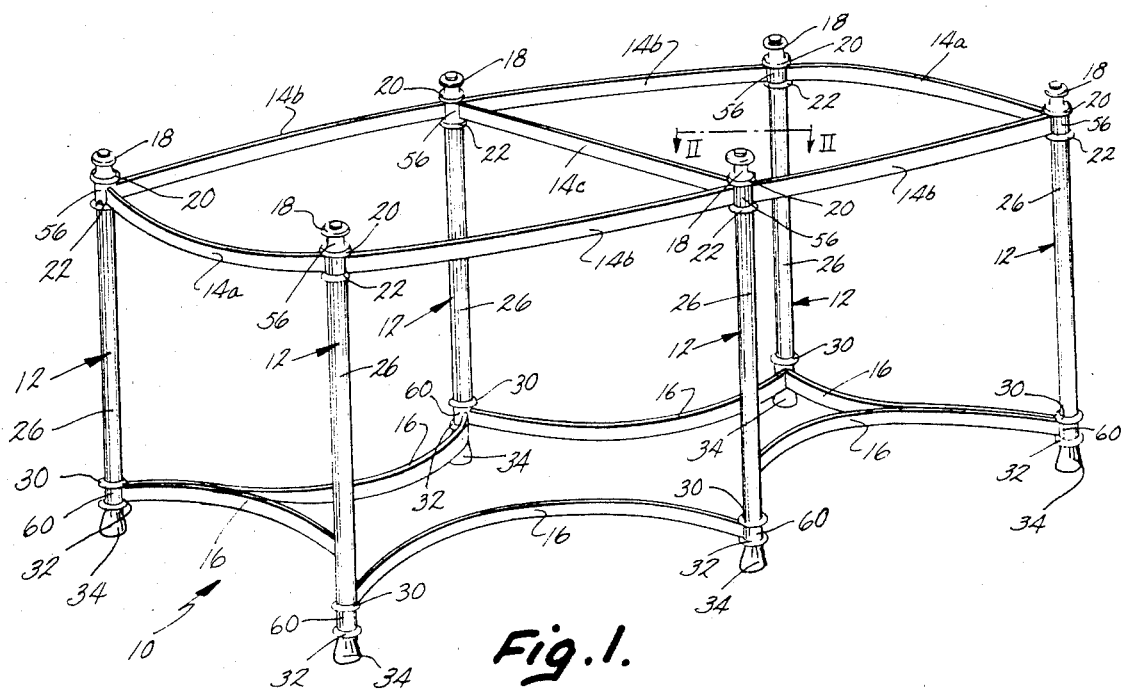
FIG. 1 is a perspective view of the table support structure of the present invention.

Table support structure 10 (FIG. 1) constructed in accordance with a preferred embodiment of the invention includes six generally vertical leg assemblies 12 interconnected at their upper ends by rails 14 and at their lower ends by stretchers 16. Leg assemblies 12 are capped by finials 18, which together support a tabletop (not shown).

Leg assembly 12 (FIG. 3) includes, from top to bottom, finial 18, collar 20, support sleeve 56, collar 22, spacer 24, tube 26, spacer 28, collar 30, support sleeve 60, collar 32, and foot 34. Tie-rod 36 extends the full height of leg assembly 12 and is anchored at its upper end in finial 18 and at its lower end within foot 34 using nut 38. Angled notches 40 and 42 extend into rail 14 generally opposite one another. Similarly, angled notches 44 and 46 extend into stretcher 16 also generally opposite one another. Collars 20, 22, 30, and 32 include frusto-conical surfaces 48, 50, 52, and 54, respectively, which engage notches 40, 42, 44, and 46, respectively. Rail support sleeve 56 extends between collars 20 and 22 and receives rail 14 through slot 58. Similarly, stretcher support sleeve 60 extends between collars 30 and 32 and receives stretcher 16 through aperture 62. Both of slots 58 and 62 are dimensioned to support rail 14 and stretcher 16 from twisting with respect to leg assembly 12. As nut 38 is tightened on tie-rod 36, frusto-conical surfaces 48, 50, 52, and 54 engage and slide along angled notches 40, 42, 44 and 46, respectively, to draw rail 14 and stretcher 16 against tie-rod 36 to secure the rail and stretcher. Sleeves 56 and 60 support rail 14 and stretcher 16, respectively, from twisting within the sleeve, i.e., with respect to leg assembly 12. Because all of the elements of leg assembly 12 remain in fixed angular relationship to one another and to rail 14 and stretcher 16 as nut 38 is tightened, collars 20, 22, 30, and 32 do not rotate against the rail and stretcher and do not place lateral or twisting force on the rail and stretcher.

Turning more specifically to the construction of support structure 10 (FIG. 1), it is seen that the assembly includes six leg assemblies 12 interconnected by seven rails 14, and six stretchers 16. Each of leg assemblies 12 is generally identical with the exception of rail sleeves 56 as will be described. Stretchers 16 are also generally identical to one another and each interconnect two of leg assemblies 12. Rails 14 generally fall into one of three categories: (1) end rails 14a are located at either end of the table assembly; (2) side rails 14b are located along the sides of the assembly; and (3) central rail 14c interconnects the two leg assemblies 12 located midway along the length of structure 10. Rails 14a are the most curvilinear, while rail 14c is generally straight, and rails 14b are less curvilinear than rails 14a but more so than rail 14c. A glass tabletop (not shown) is supported on leg assemblies 12.

Now turning to the construction of leg assemblies 12 (FIG. 3), it is seen that finial 18 defines bumper bore 64, integrally threaded tie-rod bore 66, and centering depression 68, all of which are generally coaxially aligned. Bumper 70 includes a shaft 72 which extends into smooth bumper bore 64.

Collar 20 defines smooth tie-rod bore 74. Centering projection 76 extends upwardly into and interfits closely with depression 68 in finial 18 to coaxially align collar 20 with the finial. Collar 20 includes a downwardly extending annular extension which includes interior, frustoconical surface 48 and exterior wall 79, which generally conforms to the cross-sectional shape of sleeve 56 to properly align the sleeve with collar 20. Immediately adjacent and encircling annular extension 78 is downwardly opening annular groove 80 into which sleeve 56 extends.

Collar 22 defines smooth tie-rod bore 82. Collar 22 includes upwardly extending annular extension 84, which defines interior, frusto-conical surface 50 and outer wall 86, which generally conforms to the cross-sectional shape of sleeve 56. Immediately adjacent and encircling extension 84 is upwardly opening groove 88 which receives sleeve 56. Fluted portion 89 extends downwardly into spacer 24.

Each rail 14 is generally rectangular in cross section (FIGS. 2 and 3), being about six to seven times as high as wide. Further each rail 14 terminates in rail end 91 (FIG. 3) positioned between collars 20 and 22 and abutting tie-rod 36. Notches 40 and 42 extend into rail end 91 generally opposite one another and include angled sides 93 and 95, respectively.

Figure 4:
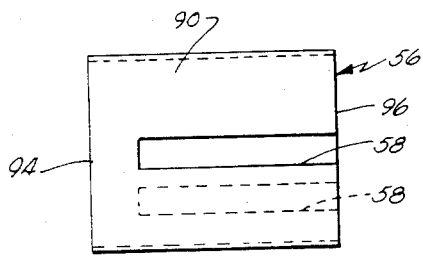
FIG. 4 is an elevational view of the rail support sleeve.
Figure 5:
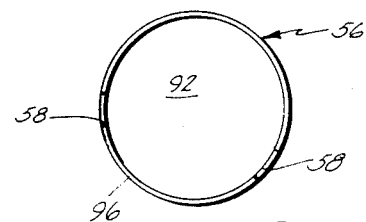
FIG. 5 is a plan view of the rail support sleeve.

Rail sleeve 56 (FIGS. 3, 4, and 5) is a generally cylindrical member comprising a wall 90 defining an interior bore 92 and terminating in upper, open end 94 positioned in groove 80 and lower, open end 96 positioned in groove 88. Slots, or openings, 58 are oriented generally longitudinally on sleeve 56 and extend from lower end 96 toward upper end 94. In the preferred embodiment, each of slots 58 extends approximately 80% of the distance between upper and lower ends 94 and 96. Rail slots 58 are angularly oriented with respect to one another to properly receive a pair of rails, for example 14a and 14b (FIGS. 2 and 5). This angular orientation will differ depending on the angle between the rails received by the corresponding leg assembly 12. Sleeves 56 on assemblies 12 receiving rail 14c will include three of slots 58 to receive one rail 14c and two rails 14b. Each of slots 58 is dimensioned to support its respective rail against significant twisting with respect to sleeve 56 and, consequently, with respect to leg assembly 12 (FIG. 2). More particularly, the cross-sectional shape of slot 58 closely conforms to the cross section of rails 14 (FIGS. 2 and 3).

Spacers 24 and 28 (FIG. 3) are generally identical to one another, including smooth tie rod bores 98 and 100, respectively. Both of spacers 24 and 28 include centering projections 102 and 104, respectively, and centering depressions 106 and 108, respectively, all of which are generally coaxially aligned with tie-rod bores 98 and 100. Both of projections 102 and 104 have a cross section generally conforming to the cross-sectional shape of the tube. Centering depression 106 on spacer 24 receives fluted portion 89 of collar 22 to axially align the collar and the spacer.

Tube 26 is a generally cylindrical member extending between spacers 24 and 28. The length of tube 26 is selected to provide a desired spacing between rails 14 and stretchers 16.

Collar 30 is generally identical to collar 22, however oriented 180° opposite to collar 22 with respect to tie-rod 36. Collar 30 includes an annular extension 110 defining interior frusto-conical wall 52 and outer wall 112, which closely conforms to the cross-sectional shape of sleeve 60 to facilitate alignment of the collar with the sleeve. Annular groove 114 surrounds extension 110 to receive the upper end of sleeve 60. Collar 30 includes fluted portion 116 which extends upwardly to closely interfit with centering depression 108 on spacer 28 to axially align the collar and spacer.

Collar 32 is generally identical to collar 20, however oriented 180° opposite to collar 20 with respect to tie-rod 36. Collar 32 defines smooth tie-rod bore 118 and annular extension 120, which includes a frusto-conically shaped interior wall 54 and an exterior wall 121 conforming to the cross-sectional shape of sleeve 60. Annular groove 122 surrounds extension 120 to receive the lower end of stretcher sleeve 60. Finally, collar 32 terminates at its lower end in centering projection 124.

Each stretcher 16 is generally rectangular in cross section, being about six to seven times high as wide. Further, each stretcher 16 terminates in stretcher end 126 (FIG. 3) which is positioned between collars 30 and 32 and abuts tie-rod 36. Notches 44 and 46 extend into stretcher end 126 generally opposite one another and include angled sides 128 and 130, respectively.

Figure 6:
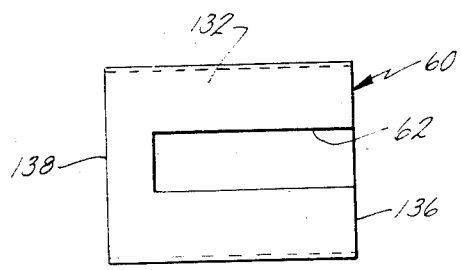
FIG. 6 is an elevational view of the stretcher support sleeve.
Figure 7:
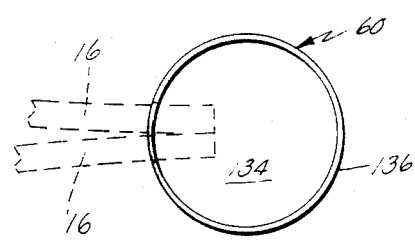
FIG. 7 is a plan view of the stretcher support sleeve with two stretchers shown in phantom.

Stretcher sleeve 60 (FIGS. 3, 6, and 7) is a generally cylindrical member comprising wall 132 defining bore 134 and terminating in an upper, open end 136 and lower, open end 138. The diameters of sleeves 56 and 60 are generally the same, and their lengths (FIGS. 4 and 6) are also generally identical. A slot, or opening 62, extends longitudinally into wall 132 from upper end 136. In the preferred embodiment, slot 62 extends approximately 80% along the length of the sleeve. Two stretchers 16 enter a stretcher sleeve 60 through slot 62 (FIG. 7). Slot 62 is dimensioned to support two of stretchers 16 positioned adjacent one another. More particularly, the dimensions of slot 62 are selected to conform to approximately twice the cross-sectional shape of a single stretcher 16.

Foot 34 (FIG. 3) defines a smooth tie-rod bore 140, centering depression 142, and cylindrical nut recess 144, all of which are generally coaxially aligned.

Tie-rod 36 includes an upper, externally threaded end 145 in tie-rod bore 66 and extends through all of collar 20, sleeve 56, collar 22, spacer 24, tube 26, spacer 28, collar 30, sleeve 60, collar 32, and foot 34. Tie-rod 36 also includes lower threaded end 146 positioned in nut recess 144. Washer 148 is positioned about lower end 146 abutting foot 34, and nut 38 is in threaded engagement with the lower, tie-rod end.

Operation

Table support structure 10 of the present invention is an extremely rigid assembly due to the unique structure of leg assemblies 12, rails 14, and stretchers 16. During manufacture, leg assemblies 12 are loosely assembled for shipment by first threading upper end 145 of tie-rod 36 into tie-rod bore 66 in finial 18. Next, the following elements are placed over tie-rod 36 in the following order: collar 20, sleeve 56, collar 22, spacer 24, tube 26, spacer 28, collar 30, sleeve 60, collar 32, and foot 34. Washer 148 is then positioned over lower end 146 of tie-rod 36 and nut 38 is only initially threaded onto tie-rod 36 to loosely secure all of the elements on tie-rod 36 together. Bumper 70 is positioned in finial 18 to complete leg assembly 12.

Leg assemblies 12, rails 14, and stretchers 16 are shipped unassembled to conserve shipping and storage space cost. When support structure 10 is to be assembled, rails 14 and stretchers 16 must be secured within leg assemblies 12. Rails 14, and more particularly rail ends 91, are inserted through sleeve 56, and more particularly through slots 58, and positioned between collars 20 and 22, which are pushed away from each other on untightened assembly 12 so that the rails may easily fit therebetween. When rails 14 are properly positioned, collars 20 are then pushed toward one another so that annular extensions 78 and 84 extend into notches 40 and 42, respectively, with frusto-conical walls 48 and 50 engaging angled sides 93 and 95, respectively. As collars 20 and 22 are urged toward one another, outer walls 79 and 86 align sleeve 56 with collars 20 and 22 with upper end 94 seating in groove 80 and lower end 96 seating in annular groove 88.

Stretchers 16 are then positioned by pushing collars 30 and 32 away from one another on untightened assembly 12 and inserting stretcher ends 126 through sleeves 60, and more particularly through slot 62, positioning the rail end between the collars. Collars 30 and 32 are then pushed toward one another so that annular extensions 110 and 120 extend into notches 44 and 46, respectively, with frusto-conical walls engaging sides 128 and 130, respectively. Outer walls 112 and 121 extend into sleeve 60 to center the sleeve with respect to collars 30 and 32 with upper end 136 seating in groove 114 and lower end 138 seating in groove 122.

Nut 38 is then tightened on tie-rod 36 so that all of the elements of leg assembly 12 are drawn together, or toward one another. As nut 38 is tightened, it is important to insure that projection 76 from collar 20 extends into depression 68 on finial 18 to insure that the finial and collar are properly aligned. Likewise, it is important to insure that fluted portion 89 is centered in depression 106, that extensions 102 and 104 extend into tube 26, that fluted portion 116 extends into depression 108, and that extension 124 extends into depression 142. As nut 38 is tightened, frusto-conical surfaces 48, 50, 52, and 54 engage angled sides 93, 95, 128, and 130 to position rail 14 and stretchers 16 immediately adjacent and preferably into abutting relationship with tie-rod 36. Consequently, rail 14 is tightly secured between tie-rod 36 and annular extensions 78 and 84. Similarly, stretcher 16 is secured between tie-rod 36 and annular extensions 110 and 120. Sleeve 56 hides the space between collars 20 and 22 and within that sleeve, and sleeve 60 hides the space between collars 30 and 32 and within that sleeve.

Two features prevent rails 14 and stretchers 16 from twisting with respect to leg assembly 12 during tightening of assembly 12. First, because all of the elements of assembly 12 generally remain in fixed angular relationship with respect to one another as nut 38 is tightened, collars 20, 22, 30, and 32 do not rotate with respect to rails 14 and stretchers 16. Consequently, the collars do not exert lateral force on the rails and stretchers which might cause the rails and stretchers to twist as the assembly is tightened. Second, sleeves 56 and 60 support rails 14 and stretchers 16, respectively, against significant twisting with respect to the sleeves both during tightening and during subsequent use. Slots 58 closely conform to the cross-sectional shape of rails 14, to positively support the rails. Similarly, slot 62 closely conforms to the cross-sectional shape of two stretchers 16 side-by-side to positively support the stretchers.

After all of leg assemblies 12 have been tightened with rails 14 and stretchers 16 extending therebetween, the assembly of table support structure 10 is complete.

A tabletop (not shown), preferably made of glass, is then placed on top of support structure 10 so as to rest on bumpers 70 in each of finials 18.

It should be understood that the above description is intended to be that of a preferred embodiment of the invention. Various changes and alterations might be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. An article of furniture comprising:
    a tie-rod;
    a first collar member and a second collar member, said collar members being adjustably mounted on said tie-rod and generally axially aligned so as to have a common axis with said tie-rod;
    an elongated member having an end positioned between said first and second collar members and having an elongated terminal edge at its extreme end abutting said tie-rod, said elongated member extending radially from said tie-rod;
    means for drawing said first and second collar members toward one another to secure said elongated member end therebetween;
    means for urging said end of said elongated member radially inwardly toward a position immediately adjacent said tie-rod as said drawing means draws said first and second collar members toward one another for causing said elongated terminal edge to be forced and held tightly against said tie-rod; and
    a sleeve member extending between said first and second collar members, said sleeve member including first and second sleeve ends and a wall defining an opening through which said elongated member end extends and is radially shiftable therein, said opening being dimensioned to support said elongated member against significant twisting with respect to said sleeve member.

2. An article of furniture as defined in claim 1 wherein said opening is further dimensioned to conform to the cross-sectional shape of said elongated member.

3. An article of furniture as defined in claim 1 or 2 wherein said first and second collar members comprise first and second extensions, respectively, extending into said first and second sleeve ends, respectively, to aid in properly positioning said sleeve member with respect to said first and second collar members.

4. An article of furniture as defined in claim 3 wherein the cross-sectional shape of said first and second extensions conforms to the cross-sectional shape of said sleeve member.

5. An article of furniture as defined in claim 1 or 2 wherein said first and second collars define first and second annular grooves, respectively, opening toward one another and dimensioned to receive said first and second sleeve ends, respectively, and wherein said first sleeve end is seated in said first groove and said second sleeve end is seated in said second groove.

6. An article of furniture as defined in claim 1 or 2 wherein said drawing means comprises:
    a tie-rod extending through said first and second collar members and said sleeve member, said tie-rod including first and second ends operatively engaging said first and second collar members, respectively; and
    means in threaded engagement with said second end of said tie-rod and operatively engaging said second collar member for urging said second collar member toward said first collar member when said means is rotated in a first direction with respect to said tie-rod.

7. An article of furniture as defined in claim 6 wherein said drawing means further comprises means for allowing said first and second collar members to remain in fixed angular relationship when said drawing means draws said first and second collar members toward one another.

8. An article of furniture as defined in claim 3 wherein said urging means comprises:
    said elongated member end defining first and second notches generally opposite one another; and
    said first and second extensions are annular and extend into said first and second notches, respectively, to further secure said elongated member between said first and second collar members.

9. An article of furniture as defined in claim 8 wherein each of said annular extensions includes a frusto-conical interior surface and each of said notches includes an angled side mating with said interior surface.

10. An article of furniture comprising:
    a tie-rod;
    a first collar member and a second collar member, said collar members being adjustably mounted on said tie-rod and generally axially aligned so as to have a common axis with said tie-rod;
    first and second elongated members each having an end positioned between said first and second collar members, said elongated members extending radially from said tie-rod;
    means for drawing said first and second collar members toward one another to secure said elongated member ends therebetween;
    means for positioning the terminal end of each of said elongated members immediately adjacent said tie-rod when said drawing means draws said first and second collar members toward one another; and
    a sleeve member extending between said first and second collar members, said sleeve member including first and second sleeve ends and a wall defining an opening through which said elongated members extend side-by-side with one another, said opening being dimensioned to support both of said elongated members against significant twisting within said opening with respect to said sleeve member.

11. An article of furniture as defined in claim 10 wherein said opening is further dimensioned to conform to the combined cross-sectional shape of both of said elongated members.

12. A furniture assembly comprising:
    (1) an elongated, substantially horizontal member having an end and upper and lower portions; and
    (2) a substantially vertical assembly comprising:
        (a) an upper collar member engaging said upper portion of said horizontal member proximate said end;
        (b) a lower collar member engaging said lower portion of said horizontal member proximate said end, said upper and lower collar members being generally axially aligned and thereby having a common axis;

(c) a tie-rod extending centrally through said upper and lower collar members and having means for drawing said upper and lower collar members toward one another to secure said member end therebetween;

(d) said elongated member having an elongated terminal edge at its extreme end abutting said tie rod;

(e) means for urging said elongated member inwardly toward the common axis of said first and second collar members and toward said tie-rod for causing said elongated terminal edge to be forced and held tightly against said tie-rod; and (f) a sleeve member extending and secured between said upper and lower collar members, said sleeve member including first and second sleeve ends and a wall defining an opening through which said member end extends, said opening generally conforming to the cross-sectional shape of said horizontal member, said horizontal member being radially slidable within said opening to accommodate movement of said horizontal member upon actuation of said urging means, whereby as said upper and lower collar members are drawn toward one another to secure said member end therebetween, said sleeve member supports said horizontal member against significant twisting with respect to said sleeve member, and whereby said sleeve member hides the connection between said horizontal member and said collar members and the space between said first and second collar member and within said sleeve member.

13. An article of furniture as defined in claim 12 wherein said upper and lower collar members comprise first and second extensions, respectively, extending into said first and second sleeve ends, respectively, of said sleeve member to aid in properly positioning said sleeve member with respect to said upper and lower collar members.

14. An article of furniture as defined in claim 13 wherein the cross-sectional shape of said first and second extensions conforms to the cross-sectional shape of said sleeve member.

15. An article of furniture as defined in claim 12 wherein said upper and lower collar members define first and second annular grooves, respectively, opening toward one another and dimensioned to receive said first and second sleeve ends, respectively, and wherein said first sleeve end is seated in said first groove and said second sleeve end is seated in said second groove.

16. An article of furniture as defined in claim 12 wherein said drawing means comprises:

a tie-rod extending through said upper and lower collar members and said sleeve member, said tie-rod including a first end operatively engaging said upper collar member, said tie-rod including a second threaded end; and means in threaded engagement with said second end of said tie-rod, said means operatively engaging said lower collar member for urging said lower collar member toward said upper collar member when said means is rotated in a first direction with respect to said tie-rod.

17. An article of furniture as defined in claim 16 further comprising means for allowing said upper and lower collar members to remain in fixed angular relationship when said drawing means draws said upper and lower collar members toward one another.

18. An article of furniture as defined in claim 13 wherein said elongated member end defines first and second notches generally opposite one another, and wherein said first and second extensions are annular and extend into said first and second notches, respectively, to further secure said elongated member between said upper and lower collar members.

19. An article of furniture as defined in claim 18 wherein each of said annular extensions includes a frusto-conical interior surface and each of said notches includes an angled edge mating with said interior surface.

20. An article of furniture comprising:

(1) first and second elongated, substantially horizontal members each having an end and upper and lower portions; and (2) a substantially vertical assembly comprising:

(a) an upper collar member engaging said upper portions of said horizontal members proximate said ends;

(b) a lower collar member engaging said lower portions of said horizontal members proximate said ends, said upper and lower collar members being generally axially aligned and thereby having a common axis;

(c) means for drawing said upper and lower collar members toward one another to secure said member ends therebetween;

(d) means for urging said elongated members toward the common axis of said first and second collar members; and (e) a sleeve member extending and secured between said upper and lower collar members, said sleeve member including first and second sleeve ends and a wall defining an opening through which said member ends extend side-by-side with one another, said opening dimensioned to support said horizontal members, whereby as said upper and lower collar members are drawn toward one another to secure said member ends therebetween, said sleeve member supports both of said horizontal members against significant twisting with respect to said sleeve member, and whereby said sleeve member hides the connection between said horizontal members and said collar members and the space between said first and second collar members and within said sleeve member.

21. An article of furniture as defined in claim 20 wherein said opening is further dimensioned to conform to the combined cross-sectional shape of both of said elongated members.

22. An article of furniture comprising:

(1) a first elongated member including an end;

(2) a second elongated member including an end; and (3) a compression assembly comprising:

(a) a first collar member;

(b) a second collar member, said first elongated member end being positioned between said first and second collar members;

(c) a third collar member;

(d) a fourth collar member, said second elongated member end being positioned between said third and fourth collar members, all of said collar members being generally axially aligned and thereby having a common axis;

(e) a tie-rod extending centrally through said upper and lower collar members and having means operatively engaging said first and fourth collar members for urging all of said collar members together, whereby said first member end is secured between said first and second collar members and said second member end is secured between said third and fourth collar members;

(f) said elongated members each having an elongated terminal edge at its extreme end abutting said tie rod;

(g) means for urging said elongated members radially inwardly toward the common axis of said collar members and toward said tie-rod for causing said elongated terminal to be forced and held tightly against said tie-rod; and (h) means for preventing said first and second members from twisting with respect to said compression assembly, said means permitting radial movement of said first and second members.

23. An article of furniture as defined in claim 22 wherein said preventing means comprises:

a first sleeve member extending between said first and second collar members, said first sleeve member including first and second sleeve ends and a first wall defining a first opening through which said first member end slidably extends, said first opening being dimensioned to support said first elongated member against significant twisting with respect to said sleeve member; and a second sleeve member extending between said third and fourth collar members, said second sleeve member including third and fourth sleeve ends and a second wall defining a second opening through which said second member end slidably extends, said second opening being dimensioned to support said second elongated member against significant twisting with respect to said sleeve member.

24. An article of furniture as defined in claim 23 wherein said first opening is further dimensioned to conform to the cross-sectional shape of said first elongated member, and wherein said second opening is further dimensioned to conform to the cross-sectional shape of said second elongated member.

25. An article of furniture as defined in claim 22 or 23 wherein said first and second collar members comprise first and second extensions, respectively, extending into said first and second sleeve ends, respectively, to aid in properly positioning said first sleeve member with respect to said first and second collar members, and wherein said third and fourth collar members comprise third and fourth extensions, respectively, extending into said third and fourth sleeve ends, respectively, to aid in properly positioning said second sleeve member with respect to said third and fourth collar members.

26. An article of furniture as defined in claim 25 wherein the cross-sectional shapes of said first and second extensions conform to the cross-sectional shape of said first sleeve member, and wherein the cross-sectional shapes of said third and fourth extensions conform to the cross-sectional shape of said second sleeve member.

27. An article of furniture as defined in claim 23 wherein said first and second collar members define first and second annular grooves, respectively, opening toward one another and dimensioned to receive said first and second sleeve ends, and wherein said third and fourth collar members define third and fourth annular grooves, respectively, opening toward one another and dimensioned to receive said third and fourth sleeve ends, respectively, and wherein said first, second, third, and fourth sleeve ends are seated in first, second, third, and fourth grooves, respectively.

28. An article of furniture as defined in claim 23 wherein said drawing means comprises:

a tie-rod extending through said first, second, third, and fourth collar members and said first and second sleeve members, said tie-rod including a first end operatively engaging said first collar member; and means in threaded engagement with said second end of said tie-rod and operatively engaging said fourth collar member for urging said fourth collar member toward said first collar member when said means is rotated in a first direction with respect to said tie-rod.

29. An article of furniture as defined in claim 28 wherein said drawing means further comprises means for allowing said first, second, third, and fourth collar members to remain in fixed angular relationship when said drawing means draws said first and fourth collar members toward one another.

30. An article of furniture as defined in claim 22 or 23 wherein said urging means comprises:

said first elongated member end defining first and second notches generally opposite one another;

said first and second extensions being annular and extending into said first and second notches, respectively, to further secure said first elongated member between said first and second collar members;

said second elongated member end defining third and fourth notches generally opposite one another; and said third and fourth extensions being annular and extending into said third and fourth notches, respectively, to further secure said elongated member between said third and fourth collar members.

31. An article of furniture as defined in claim 30 wherein each of said annular extensions includes a frusto-conical interior surface and said notches include angled sides mating with said frusto-conical surfaces.

32. An article of furniture comprising:

(1) a first elongated member including an end;

(2) a second elongated member including an end;

(3) a third elongated member including an end; and (4) a compression assembly comprising:

(a) a first collar member;

(b) a second collar member, said first elongated member end being positioned between said first and second collar members;

(c) a third collar member;

(d) a fourth collar member, said second and third elongated member ends being positioned between said third and fourth collar members, all of said collar members being generally axially aligned and thereby having a common axis;

(e) means operatively engaging said first and fourth collar members for urging all of said collar members together, whereby said first member end is secured between said first and second collar members and said second and third member ends are secured between said third and fourth collar members;

(f) means for urging said elongated members toward the common axis of said collar members; and (g) stabilizing means for preventing said first, second, and third members from twisting with respect to said compression assembly, said stabilizing means including:

(i) a first sleeve member extending between said first and second collar members, said first sleeve member including first and second sleeve ends and a first wall defining a a first opening through which said first member end extends, said first opening being dimensioned to support said first elongated member against significant twisting with respect to said sleeve member; and (ii) a second sleeve member extending between said third and fourth collar members, said second sleeve member including third and fourth sleeve ends and a second wall defining a second opening through which said second and third member ends extend side-by-side with one another, said second opening being dimensioned to support both said second and third elongated members against significant twisting with respect to said second sleeve member.

33. An article of furniture as defined in claim 32 wherein said opening is further dimensioned to conform to the combined cross-sectional shape of both of said second and third elongated members.

34. In a furniture construction comprising a plurality of upright support members each extending along a separate axis and connected to a relatively horizontal support member extending radially away from said axis, said horizontal support member having a substantially greater width than thickness and arranged with the width dimension extending in a direction falling on a vertical plane on which said axis lies, the improvement comprising:

said upright support members each having a centrally located tie-rod and first and second collar members having centrally located openings adjustably mounted in spaced relationship on said rod with the rod extending into said openings;

said horizontal support member having an end thereof mounted between said collar members and having an elongated terminal edge at its extreme end abutting said tie-rod;

means for drawing said collar members toward one another and into abutting relationship with the said horizontal support member;

means for urging said terminal end of said horizontal support member radially inwardly to a position abutting said rod as said drawing means draws said first and second collar members toward one another for causing said elongated terminal edge to be forced and held tightly against said tie-rod; and a sleeve member extending and clamped between said first and second collar members and substantially surrounding at least the portion of said rod extending between said collar members, said sleeve member having an elongated slot having a width equal to the thickness of said horizontal support member and receiving said horizontal support member, said horizontal support member being radially shiftable within said slot.

35. A furniture construction as defined in claim 34 further comprising:

third and fourth collar members having centrally located openings adjustably mounted in spaced relationship on said rod with the rod extending into said openings, said third and fourth collar members located below said first and second collar members;

a second horizontal support member having a substantially greater height than thickness and having an end thereof mounted between said third and fourth collar members;

said drawing means further comprising means for drawing said third and fourth collar members toward one another and into abutting relationship with said second horizontal support member;

means for urging said end of said second horizontal support member radially inwardly to a position immediately adjacent said rod as said drawing means draws said third and fourth collar members toward one another; and a second sleeve member extending and clamped between said third and fourth collar members and substantially surrounding at least the portion of said rod extending between said third and fourth collar members, said second sleeve member having a second elongated slot having a width equal to the thickness of said second horizontal support member and receiving said second horizontal support member, said second horizontal support member being radially shiftable within said second slot.

36. A furniture construction as defined in claim 35 further comprising means for spacing said first and second collar members from said third and fourth collar members.

37. A furniture construction as defined in claim 36 wherein said spacing means comprises a spacer sleeve mounted on said rod with said rod extending through said sleeve.

* * * * *